Patented Aug. 18, 1931

1,819,096

UNITED STATES PATENT OFFICE

RICHARD HERZ, OF FRANKFORT-ON-THE-MAIN, AND MAX SCHUBERT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

WATER INSOLUBLE AZODYESTUFFS

No Drawing. Application filed December 4, 1929, Serial No. 411,676, and in Germany December 17, 1928.

The United States application Serial No. 392,486 of Erwin Hoffa and Erwin Thoma, filed September 13, 1929, relates to new azodyestuffs of the general formula:

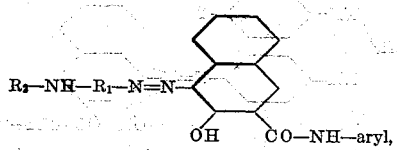

wherein $R_1$ stands for an aromatic residue whose hydrogen atoms may be substituted or not, $R_2$ for an isocyclic residue whose hydrogen atoms may be substituted or not and aryl for an aryl residue whose hydrogen atoms may be substituted or not.

Our present invention relates to certain embodiments of the above mentioned series of dyestuffs, more particularly it relates to new dyestuffs corresponding to the formula:

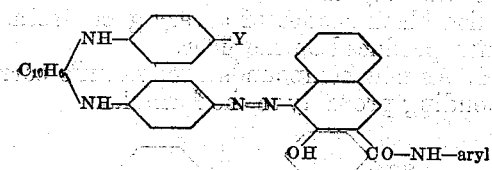

wherein aryl means a residue of the benzene or naphthalene series and Y means hydrogen or the grouping

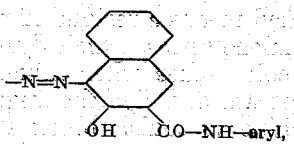

which dyestuffs yield valuable color lakes when mixed with the usual substrata and dye the vegetable fiber valuable blue to bluish black shades of a very good fastness when produced on the fiber. The new dyestuffs are obtainable by combining in substance or on a substratum, particularly on the vegetable fibers, the diazo- or tetrazocompound of a condensation product of the type:

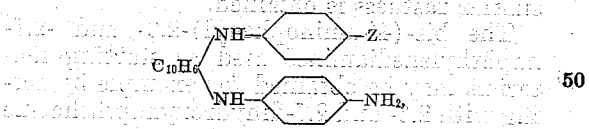

wherein Z means hydrogen or an aminogroup, with an arylamide of 2.3-hydroxynaphthoic acid. When using the N-nitroso-derivatives of the aforesaid diazo- or tetrazocompounds, the primary arzodyestuffs obtained dye red-like garnet to claret shades and the nitrosogroup is split off by treatment with a saponifying agent, advantageously with addition of a reducing agent according to U. S. application Serial No. 318,993 of Laska et al., filed November 12, 1928, whereby the final dyestuffs are obtained dyeing blue to bluish black shades.

In order to further illustrate our invention, the following examples are given, all temperatures being in centigrade degrees, but we wish it to be understood, that we are not limited to the particular products nor reaction conditions mentioned therein.

Example 1

Well boiled cotton yarn is impregnated with a solution prepared by dissolving 10 grs. of 2.3 - hydroxynaphthoyl - 4 - chloroaniline with addition of 20 ccm. of Turkey red oil, 20 ccm. of a caustic soda solution of 34° Bé. in 500 grs. of boiling water and made up to one liter. After having been well squeezed the thus impregnated material is developed with a tetrazosolution, prepared as follows:

1,8 grs. of bis-(4'-aminophenyl)-2.6-naphthylenediamine are stirred with 20 grs. of hot water, 5 ccm. of hydrochlorid acid of 20° Bé. are added and the mixture is diluted with about 200 grs. of ice water. Then the solution of 0,8 grs. of sodium nitrite in 8 grs. of water is added at about 10–15° and after a short time the tetrazosolution thus obtained is made up with cold water to one liter and neutralized with sodium acetate before using it. After having been developed the dyed material is well squeezed, washed and soaped in a boiling soap bath. The dyestuff thus formed corresponds probably to the formula:

The 6 - aminophenyl - (4'-aminophenyl) - 2-naphthylamine used as starting material may be prepared by acting with 2-hydroxy-6-phenylaminonaphthalene on para-phenylenediamine in the presence of a bisulfite solution or by treating the 6-phenylamino-2-

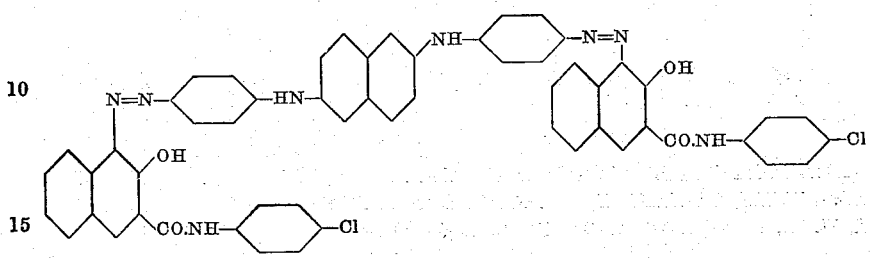

In this manner a bright bluish black dyeing of a very good fastness is obtained.

When using the tetrazocompound of the isomeric bis-(4'-aminophenyl)-2.7-naphthylenediamine a reddish blue-black dyeing of a similar fastness is obtained.

The bis-(4'-aminophenyl)-2.6- and -2.7-naphthylenediamines used as starting materials may be obtained for example by acting with 2.6- and 2.7-dihydroxynaphthalene on two molecular proportions of para-phenylenediamine in the presence of a bisulfite solution.

*Example 2*

Well boiled cotton yarn is impregnated with a solution of 4 grs. of 2.3-hydroxynaphthoyl-β-naphthylamine, 10 ccms. of Turkey red oil and 8 ccms. of a caustic soda solution of 34° Bé. in the liter and well squeezed.

43 parts of 6-phenylamino-(4'-aminophenyl) -2 - naphthylamine are diazotized with 21 parts of sodium nitrite in a hydrochloric acid solution, whereby simultaneously the N-nitrosocompound is formed. Then the liquor is diluted to a concentration of a hundredth molecule in the liter and sodium carbonate is added until the solution shows only a feeble acid reaction. The impregnated cotton yarn is developed in this solution of the nitrosodiazocompound thus formed and rinsed first with cold and then with hot water. In this manner a red like garnet dyeing is obtained.

When aftertreating this dyeing for a short time at about 80–85° with a liquor containing for instance 5 grs. of carbonate of soda, 3 grs. of soap and 0,5 grs. of anhydrous sodium sulfide in the liter and rinsing the material bright bluish black shades are obtained. The dyestuff thus produced corresponds probably to the formula:

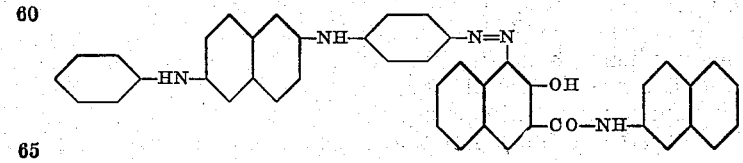

naphthol-3-carboxylic acid with para-phenylenediamine in presence of a bisulfite solution, whereby the carboxylic acid group is split off.

We claim:

1. As new compounds azodyestuffs corresponding probably to the formula:

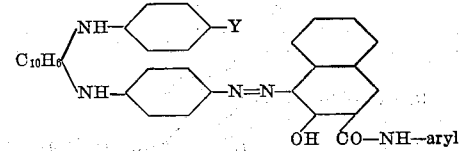

wherein aryl means a residue of the benzene or naphthalene series and Y means hydrogen or the grouping

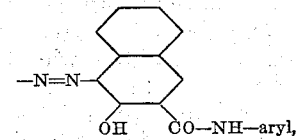

which dyestuffs yield valuable color lakes when mixed with the usual substrata and dye the vegetable fiber valuable blue to bluish black shades of a very good fastness when produced on the fiber.

2. As new compounds azodyestuffs corresponding probably to the formula:

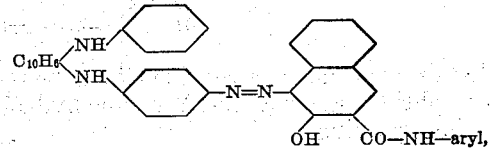

wherein aryl means a residue of the benzene or naphthalene series, which dyestuffs yield valuable color lakes when mixed with the usual substrata and dye the vegetable fiber valuable blue to bluish black shades of a very good fastness when produced on the fiber.

3. As new compounds azodyestuffs corresponding probably to the formula:

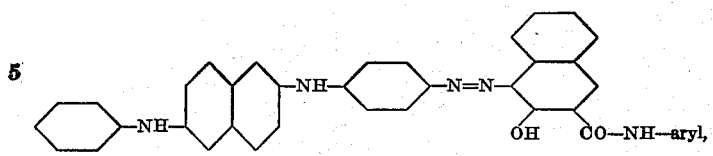

wherein aryl means a residue of the benzene or naphthalene series, which dyestuffs yield valuable color lakes when mixed with the usual substrata and dye the vegetable fiber valuable blue to bluish black shades of a very good fastness when produced on the fiber.

4. As a new compound the azodyestuff corresponding probably to the formula:

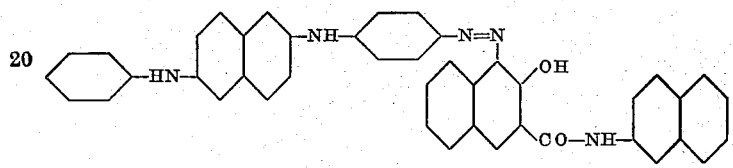

which dyestuff dyes the vegetable fiber bright bluish black shades of a good fastness when produced on the fiber.

5. Materials dyed with dyestuffs as claimed in claim 1.

6. Materials dyed with dyestuffs as claimed in claim 2.

7. Materials dyed with dyestuffs as claimed in claim 3.

8. Materials dyed with the dyestuff as claimed in claim 4.

In testimony whereof, we affix our signatures.

RICHARD HERZ.
MAX SCHUBERT.